US010042692B1

(12) United States Patent
Azad et al.

(10) Patent No.: US 10,042,692 B1
(45) Date of Patent: Aug. 7, 2018

(54) CIRCUIT ARRANGEMENT WITH TRANSACTION TIMEOUT DETECTION

(71) Applicant: Xilinx, Inc., San Jose, CA (US)

(72) Inventors: Sarosh I. Azad, Fremont, CA (US); Bhaarath Kumar, Fremont, CA (US); Tomai Knopp, San Jose, CA (US)

(73) Assignee: XILINX, INC., San Jose, CA (US)

( * ) Notice: Subject to any disclaimer, the term of this patent is extended or adjusted under 35 U.S.C. 154(b) by 154 days.

(21) Appl. No.: 14/869,821

(22) Filed: Sep. 29, 2015

(51) Int. Cl.
*G06F 11/00* (2006.01)
*G06F 11/07* (2006.01)
*G06F 11/263* (2006.01)

(52) U.S. Cl.
CPC ........ *G06F 11/079* (2013.01); *G06F 11/0736* (2013.01); *G06F 11/0757* (2013.01); *G06F 11/263* (2013.01)

(58) Field of Classification Search
CPC ............. G06F 15/7867; G06F 11/0745; G06F 11/0757; G06F 11/3027; G06F 11/1076; G06F 3/0635; G06F 3/0689; G06F 3/0634; G06F 3/0631; G06F 3/0601; G06F 3/0692; G06F 2003/0692; G06F 2003/06
See application file for complete search history.

(56) References Cited

U.S. PATENT DOCUMENTS

| 4,409,656 | A | * | 10/1983 | Andersen | G06F 13/366 709/250 |
|---|---|---|---|---|---|
| 4,998,197 | A | * | 3/1991 | Kurakazu | G06F 11/3656 710/260 |
| 5,555,425 | A | * | 9/1996 | Zeller | G06F 13/364 710/110 |
| 6,269,099 | B1 | * | 7/2001 | Borella | H04L 12/4604 370/389 |
| 6,681,283 | B1 | * | 1/2004 | Thekkath | G06F 12/0815 710/305 |
| 6,694,361 | B1 | * | 2/2004 | Shah | H04L 29/06 370/351 |
| 6,732,208 | B1 | * | 5/2004 | Alsaadi | G06F 12/0831 710/107 |
| 6,898,752 | B2 | * | 5/2005 | Tucker | H03M 13/09 370/252 |
| 7,076,595 | B1 | * | 7/2006 | Dao | G06F 15/7867 710/100 |
| 9,146,890 | B1 | * | 9/2015 | Brown | G06F 13/4022 |
| 9,529,686 | B1 | * | 12/2016 | Arbel | G06F 11/3027 |
| 2001/0037406 | A1 | * | 11/2001 | Philbrick | H04L 29/06 709/250 |

(Continued)

*Primary Examiner* — Bryce P Bonzo
*Assistant Examiner* — Jeison C Arcos
(74) *Attorney, Agent, or Firm* — LeRoy D. Maunu; Craige Thompson (57) ABSTRACT

The disclosure describes a circuit arrangement that includes a master circuit and a slave circuit. The master circuit generates transactions, and the slave circuit generates responses to the transactions from the master circuit. A first circuit is coupled between the master circuit and the slave circuit. The first circuit determines for each transaction from the master circuit whether the slave circuit generates an expected number of responses within a timeout period. For each transaction for which the slave circuit does not generate the expected number of responses within the timeout period, the first circuit generates and transmits the expected number of responses to the master circuit.

11 Claims, 5 Drawing Sheets

(56) References Cited

U.S. PATENT DOCUMENTS

| | | | |
|---|---|---|---|
| 2004/0059852 A1* | 3/2004 | Sun | G06F 13/4291 710/110 |
| 2006/0004955 A1* | 1/2006 | Ware | G11C 11/406 711/106 |
| 2006/0203846 A1* | 9/2006 | Davis | H04L 12/4604 370/466 |
| 2007/0260914 A1* | 11/2007 | Pogrebinsky | G06F 11/0745 714/5.11 |
| 2008/0098277 A1* | 4/2008 | Hazelzet | H03M 13/19 714/753 |
| 2008/0123522 A1* | 5/2008 | Elliott | H04L 12/40202 370/220 |
| 2009/0259861 A1* | 10/2009 | Tune | G06F 1/3203 713/320 |
| 2010/0305720 A1* | 12/2010 | Doll | G05B 19/042 700/86 |
| 2010/0325327 A1* | 12/2010 | Marietta | G06F 13/1642 710/240 |
| 2012/0047306 A1* | 2/2012 | Mitsubayashi | G06F 13/4036 710/306 |
| 2012/0110388 A1* | 5/2012 | Lavery | G06F 11/0757 714/47.1 |
| 2012/0116746 A1* | 5/2012 | Papariello | G06F 17/5022 703/21 |
| 2013/0242749 A1* | 9/2013 | Herz | G06F 11/0745 370/241 |
| 2014/0101477 A1* | 4/2014 | Patterson | G06F 13/4256 713/340 |
| 2015/0227475 A1* | 8/2015 | Kubo | G06F 13/1605 710/110 |
| 2015/0323956 A1* | 11/2015 | Goyal | G06F 1/04 713/600 |
| 2015/0378739 A1* | 12/2015 | Gschwind | G06F 9/3861 712/225 |

* cited by examiner

CIRCUIT ARRANGEMENT WITH TRANSACTION TIMEOUT DETECTION

FIELD OF THE INVENTION

The disclosure generally relates circuits for detecting the failure of a slave circuit to respond to a transaction from a master circuit.

BACKGROUND

Some systems employ a watchdog timer to detect when system functions have not completed within an expected period of time. The watchdog timer may be implemented as software executing on a processor. In order to avoid overloading the processor, the watchdog timer may be limited to monitoring high-level functions of the system. When the watchdog timer detects a failure of a function to complete within a prescribed period of time, a system reset may be triggered.

For some applications, a system reset may be acceptable. However, for other applications a system reset may be problematic. For example, in systems in which human safety is a concern, a system reset may be a major disruption and unacceptable. In addition, a system reset may result in the destruction of diagnostic information that might be useful in tracing the cause of a function to timely complete.

SUMMARY

In one embodiment, a circuit arrangement includes a master circuit and a slave circuit. The master circuit is configured and arranged to generate transactions, and the slave circuit is configured and arranged to generate responses to the transactions from the master circuit. The circuit arrangement further includes a first circuit coupled between the master circuit and the slave circuit. The first circuit is configured and arranged to determine for each transaction from the master circuit whether the slave circuit generates an expected number of responses within a timeout period. The first circuit is further configured and arranged to generate and transmit the expected number of responses to the master circuit for each transaction for which the slave circuit does not generate the expected number of responses within the timeout period.

In another embodiment, a method of detecting timed-out transactions between a master circuit and a slave circuit includes receiving transactions from the master circuit in a first circuit coupled between the master circuit and the slave circuit. The transactions are addressed to the slave circuit. The method has the first circuit determining for each transaction from the master circuit whether the slave circuit generates an expected number of responses within a timeout period. If the slave circuit does not generate the expected number of responses within the timeout period for a transaction, the method has the first circuit generating and transmitting the expected number of responses to the master circuit.

Other features will be recognized from consideration of the Detailed Description and Claims, which follow.

BRIEF DESCRIPTION OF THE DRAWINGS

Various aspects and features of the systems and methods will become apparent upon review of the following detailed description and upon reference to the drawings in which.

DETAILED DESCRIPTION OF THE DRAWINGS

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

According to the disclosed circuits and methods, a timeout circuit is coupled between a master circuit and a slave circuit. The master circuit generates transactions that are addressed to the slave circuit, and the slave circuit processes the transactions. For example, the transactions may include read transactions for reading data from a memory circuit or write transactions for writing data to a memory circuit. If operating correctly, the slave circuit responds to the master circuit within an expected period of time, with either data or a status signal. Without the timeout circuit, the master circuit would be subject to hanging in the event the slave circuit did not respond to a transaction from the master circuit. In other words, the master circuit may remain in a state waiting for the slave circuit to respond, and the slave circuit may never respond.

The timeout circuit tracks transactions generated by the master circuit. The timeout circuit captures transactions from the master circuit without introducing any latency in the path to the slave circuit. For each transaction from the master circuit, the timeout circuit determines whether the slave circuit generates an expected number of responses within a timeout period. For each transaction for which the slave circuit does not generate the expected number of responses within the timeout period, the timeout circuit generates the required number of responses and an additional error signal to the master circuit. The timeout circuit thereby prevents the master circuit from hangs caused by the failure of the slave circuit to respond, without introducing latency in the path from the master circuit to the slave circuit and without incurring processing overhead for the master circuit.

Figure 1:
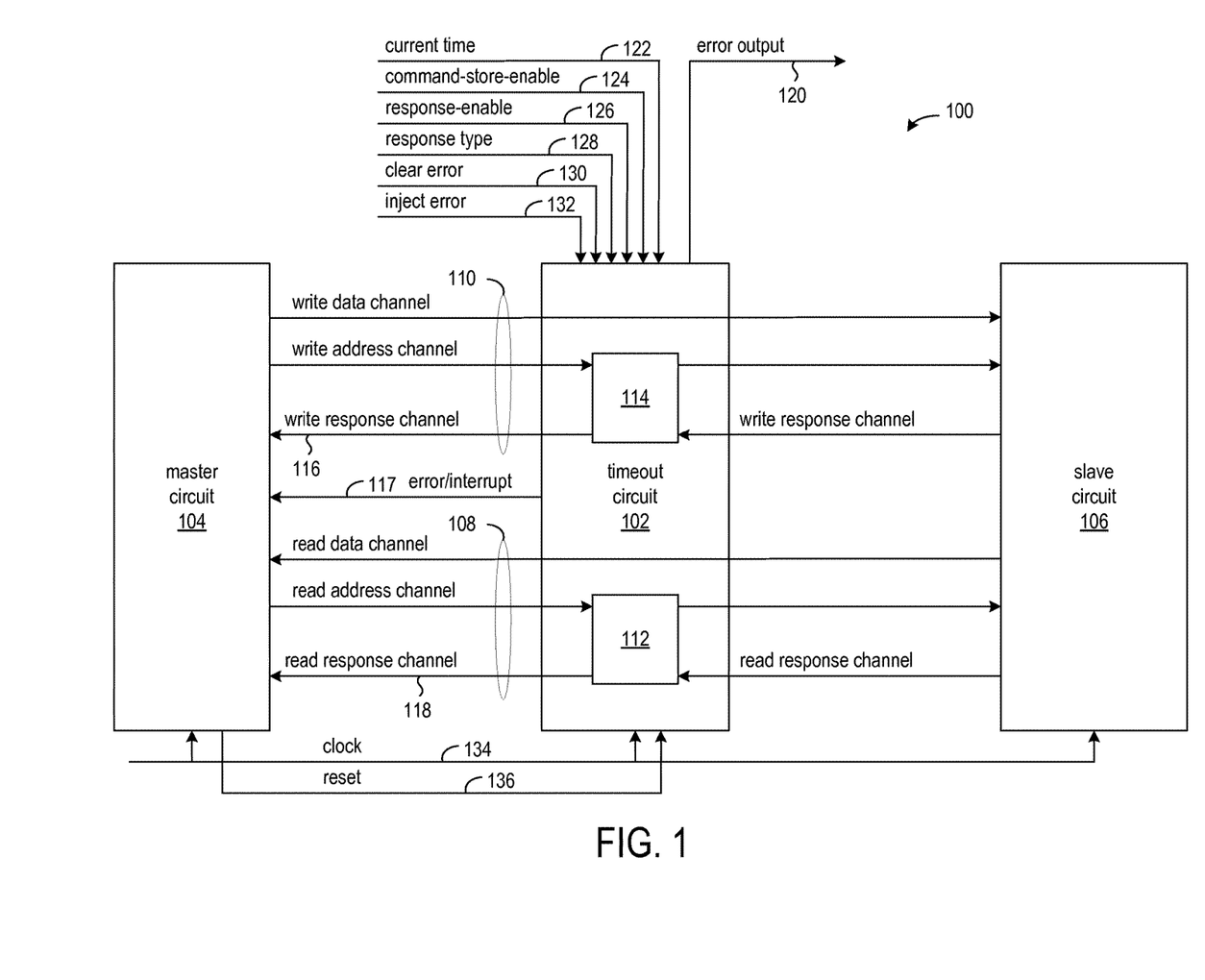
FIG. 1 shows a circuit arrangement having a timeout circuit coupled between a master circuit and a slave circuit.

FIG. 1 shows a circuit arrangement 100 having a timeout circuit 102 coupled between a master circuit 104 and a slave circuit 106. The master circuit and slave circuit may operate according to any one of a number of bus interface protocols. For example, the master circuit may issue write and read transactions to the slave circuit consistent with the AXI protocol.

Figure 2:
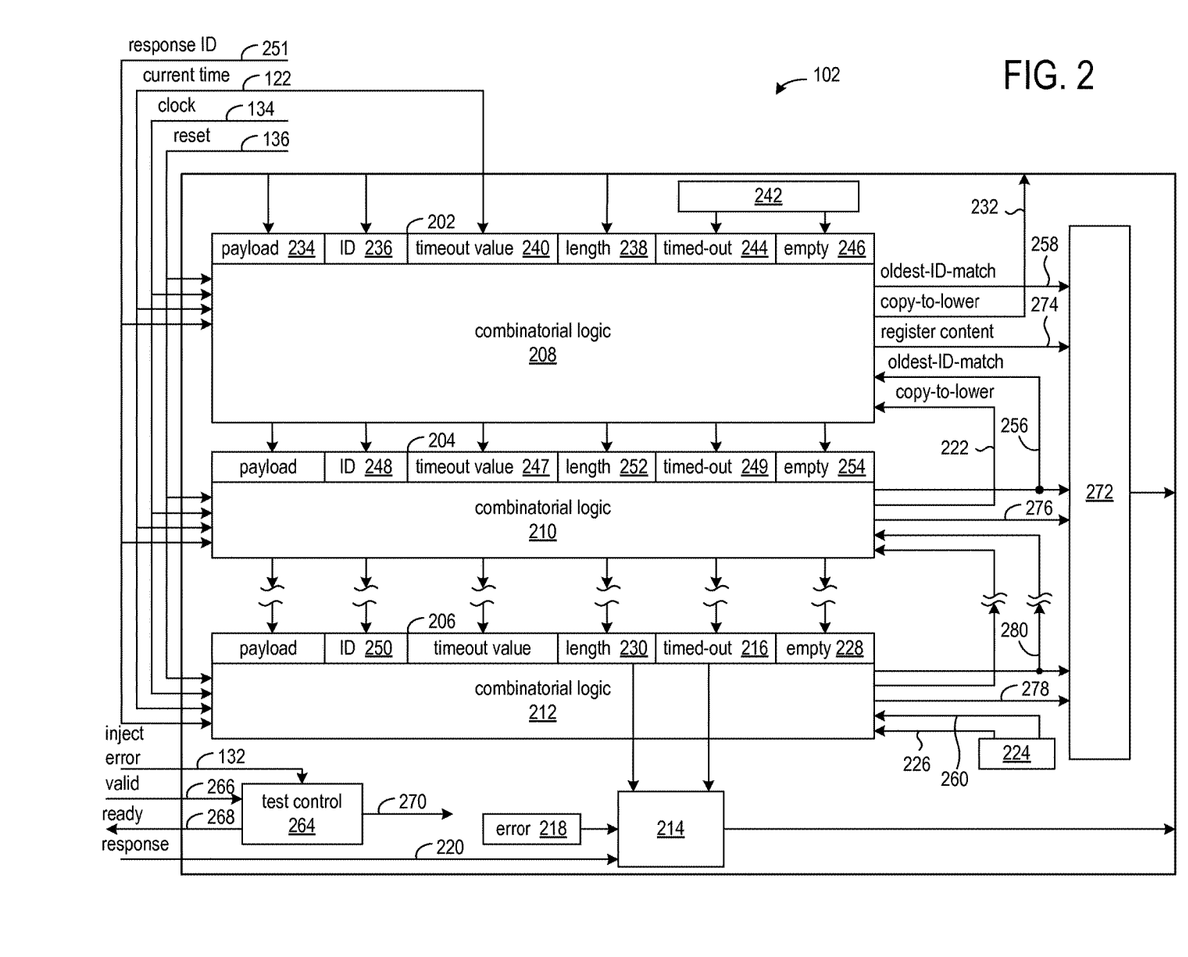
FIG. 2 shows a timeout circuit according to one implementation.

The timeout circuit 102 tracks n transactions on the read channel 108 and n transactions on the write channel 110, where n is application dependent. When a read or write transaction is sent by the master circuit, the timeout circuit stores data that describes the transaction in a top-most register in a stack of registers, which is shown in FIG. 2. The timeout circuit tracks transactions of the read channel in register stack 112, and in parallel tracks transactions of the write channel in register stack 114.

For each transaction, the timeout circuit 102 may be configured to store in a register of the register stack a transaction identifier (ID), a transaction length, and a 2-bit timeout value indicative of the time at which the transaction entered the timeout circuit. The timeout value, length, and transaction identifier (ID) are used by the timeout circuit to determine when a transaction has timed-out. If the slave circuit 106 sends the expected number of responses, as indicated by the length for a transaction, within a timeout period marked by the timeout value, the entry is removed from the register stack and transaction information is shifted down in the stack. A transaction is timed-out if the slave circuit does not return the expected number of responses within the timeout period indicated by the timeout value.

For a timed-out transaction, the timeout circuit 102 stores a timeout flag in the register of the register stack for that transaction, and once the information describing the timed-out transaction has been shifted to the bottom-most register in the register stack, the timeout circuit generates the required number of responses to the master circuit 104. Each response may include an error code indicating the occurrence of an error with the slave in processing the transaction. For example, the timeout circuit may transmit the required number of responses to the master circuit on write response channel 116 for a timed-out write transaction, and transmit the required number of responses to the master circuit on read response channel 118 for a timed-out read transaction. The timeout circuit may also generate an additional error and/or interrupt signal 117 to the master circuit and optionally to a processor (not shown) to indicate the timeout scenario. The timeout circuit prevents the master circuit from hanging if a transaction response is not received from the slave circuit.

The timeout circuit 102 may be controlled by a processor (not shown), for example, through a collection of signals provided by the processor as input to the timeout circuit. The timeout circuit may also output an error/interrupt signal 120 to the processor circuit when a timeout is detected. The current time signal 122 is a two-bit signal input to the timeout circuit and indicates a current time. The current time is used as a timestamp to indicate the time at which a transaction enters the timeout circuit. The current time is also used by the timeout circuit to determine whether or not a transaction has timed-out based on the recorded timestamp. In an example implementation, a processor increments a two-bit counter at a selected rate, and the timeout circuit determines that a transaction has timed-out if the input current time is equal to the stored timestamp for a transaction.

The command-store-enable signal 124 controls whether or not the timeout circuit 102 captures transaction data. If the command-store-enable signal is logic 1, the timeout circuit captures transaction data of transactions from the master circuit. If the command-store-enable signal is logic 0, the timeout circuit does not capture transaction data of transactions from the master circuit, effectively disabling the timeout circuit from detecting timed-out transactions.

The response-enable signal 126 controls whether or not the timeout circuit sends responses to the master circuit. If the response-enable signal is logic 0, the timeout circuit connects the response channel from the slave circuit directly to the master circuit, and the timeout circuit will not send any responses indicative of timed-out transactions to the master circuit. If the response-enable signal is logic 1, the timeout circuit sends responses indicative of timed-out transactions to the master circuit.

The response type signal 128 controls the type of response signal the timeout circuit sends to the master circuit. If the response type is logic 1, the timeout circuit sends a response having a code indicating a slave error, and if the response type is logic 0, the timeout circuit sends a response having a code indicating an OKAY status. The OKAY status may be useful for master circuits that are unable to handle a slave error status. An interrupt signal 117 may be generated to the master circuit for both states of the response type signal.

The clear error signal 130 controls clearing of the output error signal 120. If the clear error signal is logic 1, the timeout circuit will clear the error signal 120.

The inject error signal 132 controls whether or not the timeout circuit operates in a test mode. According to one implementation, the inject error signal is used in conjunction with a handshaking protocol between the master circuit 104 and the slave circuit 106. For example, if operating according to a handshaking protocol, the master circuit may assert a valid signal (not shown) concurrent with generating a transaction, that is transmitting signals that describe the transaction. Once the slave circuit receives the valid signal, responds with a ready signal, and the master circuit receives the ready signal, the master need not hold the transaction signals steady. If the inject error signal is logic 1, when the timeout circuit sees a valid signal it responds with a ready signal and does not transmit the valid signal to the slave circuit. As the slave circuit did not receive the valid signal, it will not record and process the transaction from the master circuit. The timeout circuit records transaction data, and because the slave circuit did not receive the valid signal and record the transaction, the slave circuit will not process the transaction, and the transaction will timeout.

The timeout clock 102 uses the same clock signal 134 as the master and slave circuits. The reset signal 136 is a synchronous signal from the master circuit, and during reset, the master-slave interface becomes transparent and the logic of the timeout circuit does not track transactions.

FIG. 2 shows a timeout circuit according to one implementation. The timeout circuit 102 includes a register stack having n registers and associated combinatorial logic circuits, where n is implementation dependent. Three registers 202, 204, and 206 and the associated combinatorial logic circuits 208, 210, and 212 are shown. The combinatorial logic circuits generally clear registers for completed transactions, shift transaction information through the register stack, and detect timed-out transactions. In the illustrated circuit, transaction information enters the register stack at register 202, and transaction information for incomplete transactions is shifted toward register 206 as information for completed transactions is removed from the register stack.

The timeout circuit 102 further includes circuitry for returning an appropriate response(s) for a transaction to the master circuit. Circuit 214 determines whether or not the timed-out value 216 in the bottom-most register 206 indicates that the identified transaction has timed-out. If the timed-out value 216 indicates the transaction has timed-out, circuit 214 selects the response in error register 218 and returns multiple instances of that response as indicated by the length value 230. The response in error register 218 may contain an error code or OK status depending on the state of the response type signal 128 as indicated above. If the transaction has not timed-out, circuit 214 selects the response on response channel 220 from the slave circuit and returns that response to the master circuit.

Signals that control shifting of transaction information propagate from the bottom-most register 206 to the top-most register 202. In addition, for multiple registers in the register stack having a transaction ID that matches an input transaction ID in a response from the slave circuit, signals that indicate the register having the oldest matching transaction information are also propagated from the bottom of the register stack to the top of the register stack. The signals that indicate the oldest entry in the stack ensure that the stack entry for the oldest transaction is the only entry removed from the stack, and any stack entry above the oldest transaction and having a matching transaction ID is not removed. The combinatorial logic circuit associated with each register in the register stack inputs a copy-to-lower signal and outputs a copy-to-lower signal. The input copy-to-lower signal enables the combinatorial logic circuit to copy the information from the register above in the stack to the register associated with the combinatorial logic circuit. For registers in the register stack other than the bottom-most register, the input copy-to-lower signal is the output copy-to-lower signal from the next lower register in the stack. For example, the output copy-to-lower signal 222 from combinatorial logic 210 is the input copy-to-lower signal to combinatorial signal 208.

Figure 3:
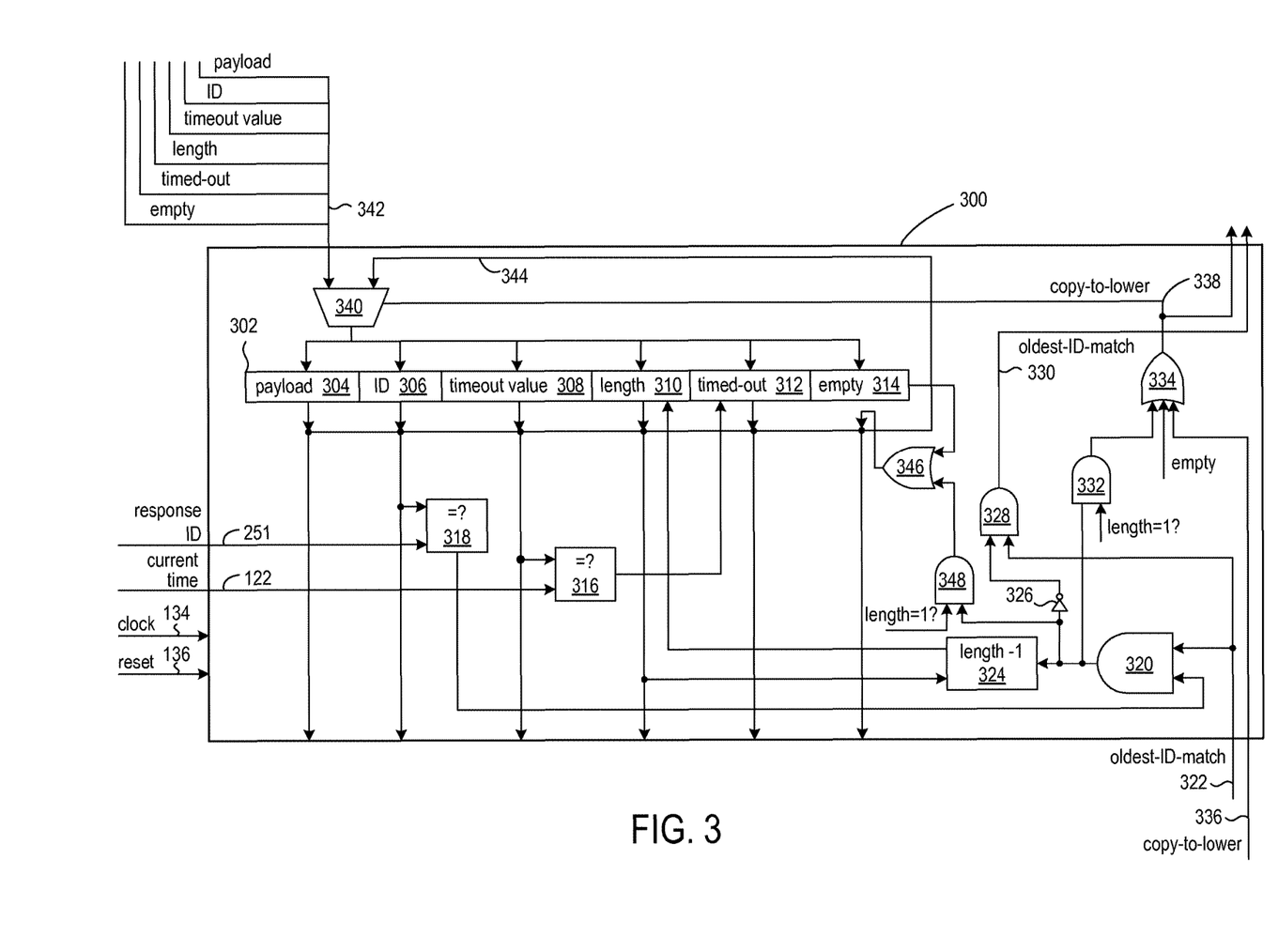
FIG. 3 shows the circuitry of one level of the register stack in the timeout circuit.

For the bottom-most register 206, circuit 224 inputs a constant logic 0 as the input copy-to-lower signal 226 to combinatorial logic circuit 212, because the empty value 228 and the length value are used in combination with the input copy-to-lower signal to control copying of the transaction information from the register above, as shown in FIG. 3. For the top-most register 202, the output copy-to-lower signal 232 is sent to the master circuit to indicate whether or not the register stack is full. For example, if the copy-to-lower signal 232 is logic 0, the register stack is full and the master circuit stops transmission of transaction information until the copy-to-lower signal changes to logic 1.

The transaction information from the master circuit to the timeout circuit includes the transaction payload, the transaction ID, and the transaction length, which are stored as payload value 234, ID value 236, and length value 238 in the top-most register 202 of the register stack. The input current time 122 from a processor, for example, is stored as the timeout value 240 in the register 202 when the transaction information is stored. Circuit 242 provides constant values to initialize the top-most register 202 when new transaction information is stored. The initial timed-out value 244 may be logic 0 to signify that the transaction has not timed-out, and the empty value 246 may be logic 0 to signify that the register is not empty. As each new value of current time 122 is input, the combinatorial circuits compare the input value of current time 122 to the timeout values in the associated registers. If the values are equal, the combinatorial logic circuit stores a logic 1 in the timed-out value in the register. For example, if the timeout value 247 is equal to the input value of the current time 122, combinatorial logic circuit 210 stores a logic 1 in timed-out value 249.

The timeout circuit receives the response ID 251 for a completed transaction from the slave circuit, and the response ID is input to each of the combinatorial logic circuits 208, 210, and 212. If there is only one of registers 202, 204, or 206 having a matching ID value 236, 248, or 250 and the length value 238, 252, or 230 in the register having the matching ID value is one, then the transaction is complete. When a transaction is complete, the combinatorial logic circuit stores a logic 1 as the empty value in the register. The empty value is also logic 1 when no transactions are tracked in the register stack. For example, if register 204 has the only ID value 248 that matches the input response ID and the length value 252 is one, the combinatorial logic circuit 210 stores a logic 1 as the empty value 254. The empty value 254 being logic 1 then causes the combinatorial logic 210 to copy the contents of register 202 to register 204.

In some instances, the same transaction ID may be used for multiple transactions. Oldest-ID-match signals are used to indicate which register in the register stack has information of the oldest transaction having the same ID value as the input response ID 251. For example, if ID values 236 and 248 in registers 202 and 204 are equal to the value of response ID 251, the transaction information in register 204 would describe a transaction that is older than the transaction described by register 202, and the oldest-ID-match signal 256 would be set to a value indicating register 204 contains the oldest matching ID value. In an example implementation, the output oldest-ID-match signals associated with each register below the register having the oldest matching ID ("matching register") in the register stack are set to logic 1, and the oldest-ID-match signals of the matching register and registers above the matching register in the register stack are set to logic 0. Thus, the combinatorial logic circuit associated with the matching register outputs the first logic 0 of the output oldest-ID-match signals from bottom to top of the register stack of registers. For example, if ID values 236 and 248 in registers 202 and 204 are equal to the value of response ID 251, then the oldest-ID-match signal 260 associated with register 206 and the oldest-ID-match signals (not shown) associated with registers (not shown) up to but not including register 204 are all logic 1. The oldest-ID-match signals 256 and 258 associated with registers 204 and 202, respectively, are logic 0. The signals that indicate the oldest entry in the stack ensure that the stack entry for the oldest transaction is the only entry removed from the stack, and any stack entry above the oldest transaction and having a matching transaction ID is not removed.

Circuit 224 inputs a constant logic value 1 for oldest-ID-match signal 260 to the combinatorial logic 212 circuit associated with the bottom-most register 206.

The inject error signal 132 is input to test control circuit 264. As described above, the inject error signal is used in conjunction with a handshaking protocol between the master circuit 104 and the slave circuit 106. If the inject error signal is logic 1, when the test control circuit 264 sees a valid signal 266 it responds with a ready signal 268 and does not transmit the valid signal 270 to the slave circuit. As the slave circuit did not receive the valid signal, it will not process a subsequent transaction from the master circuit. The timeout circuit then records transaction data, and since the slave circuit is not a state to receive the transaction, the transaction will timeout.

The timeout circuit 102 may further include a circuit 272 that selects and outputs transaction data for debugging purposes. Circuit 272 inputs the transaction information from each of the registers 202, 204, and 206 as illustrated by signal lines 274, 276, and 278. The oldest-ID-match signals 258, 256, and 280 indicate to circuit 272 which of the transaction information to select. For example, if register 204 contains the oldest transaction information having an ID value 248 that matches the input response ID 251, the oldest-ID-match values 258, 256, and 280 cause circuit 272 to select the contents of register 204 as provided by signal line 276.

The clock signal 134 and reset signal 136 are as described for FIG. 1. The circuitry of the registers 202, 204, and 206, combinatorial logic circuits 208, 210, and 212, response and error reporting circuitry, and test circuitry may be replicated in order to provide an instance for a read channel and another instance operating in parallel for the write channel.

FIG. 3 shows the circuitry of one level 300 of the register stack in the timeout circuit. The circuitry includes a register 302 having a payload value 304, ID value 306, timeout value 308, length value 310, timed-out value 312, and empty value 314 as described above. The associated logic circuitry controls copying transaction information from the register above in the register stack, determining whether the register matches a completed transaction, updating the empty value 314, determining whether or not the transaction identified by the information in the register timed-out, updating the timed-out value 312, updating the length value 310 for a matching transaction, and indicating whether or not the transaction identified by the transaction information is the oldest matching transaction in the register stack.

Circuit 316 compares the input current time 122 to the timeout value 308 from register 302. If the values are equal, the transaction identified by the information in the register has timed-out, and circuit 316 stores a logic 1, for example, as the timed-out value 312 in the register. If the values are not equal, the timed-out value 312 is not updated.

Circuit 318 compares the input response ID 251 to the ID value 306 in the register 302. If the ID values are equal, a logic 1 is provided as input to AND circuit 320. AND circuit 320 inputs the output signal from circuit 318 and the input oldest-ID-match signal 322. The output of AND circuit 320 is provided as a control input to circuit 324. Circuit 324 decrements the length value 310 from the register 302 and stores the decremented length value back in the register.

The output of AND circuit 320 is also provided to inverter circuit 326, which inverts the signal stage and provides the inverted signal as input to AND circuit 328. A second input to AND circuit 328 is the oldest-ID-match signal 322. The output from AND circuit 328 is the oldest-ID-match signal 330, which is output to circuitry in the level above level 300 in the register stack.

The output signal from AND circuit 320 is also input to AND circuit 332, along with a signal indicating whether or not the length value 310 is equal to one. The output signal from AND circuit 332 is input to OR circuit 334, along with the empty value 314 and the input copy-to-lower signal 336. The output signal from OR circuit 334 is the output copy-to-lower signal 338, which is output to circuitry in the level above level 300 in the register stack. The copy-to-lower signal 338 is also input as a control signal to multiplexer circuit 340. If the copy-to-lower signal 338 is logic 1, the transaction information 342 from the register above level 300 in the register stack is selected for storage in the register 302. Otherwise, the current contents 344 are selected for storage in the register 302.

The empty value 314 is updated as a function of the OR circuit 346 and AND circuit 348. AND circuit 348 inputs the output signal from AND gate 320 and a signal that indicates whether or not the length value 310 is equal to 1. The output signal from the AND circuit is input to OR circuit 346 along with the empty value 314. The output signal from OR circuit 346 is one of the inputs provided to multiplexer circuit 340 as described above.

Figure 4:
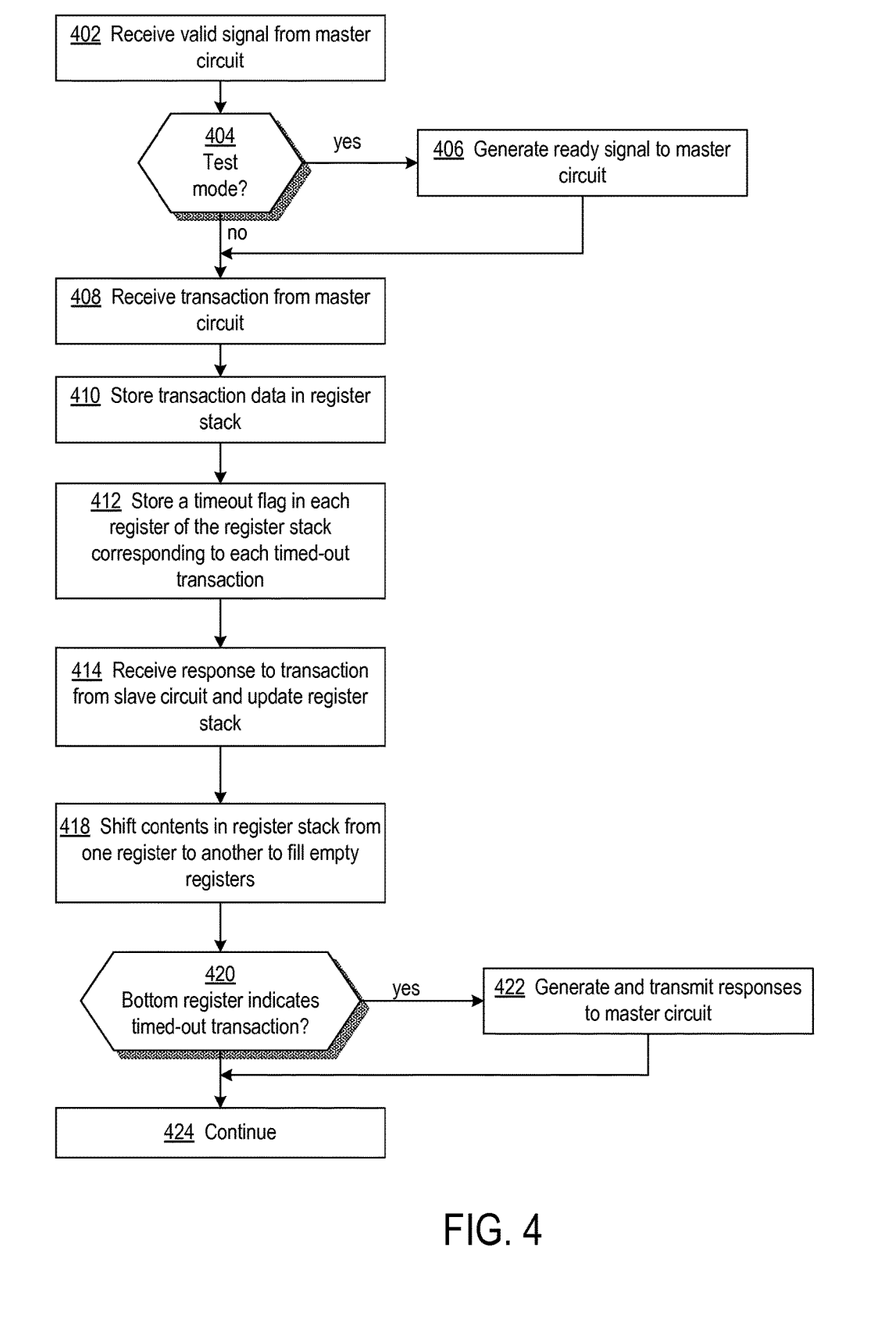
FIG. 4 shows a flowchart of a process for detecting timed-out transactions in a circuit arrangement.

FIG. 4 shows a flowchart of a process for detecting timed-out transactions in a circuit arrangement. According to one implementation, a master circuit and a slave circuit implement a handshake protocol for initiating transactions, and the timeout circuit provides a test mode by which the timeout circuit may be tested by participating in the handshaking.

At block 402, the timeout circuit receives a valid signal of the handshake protocol from the master circuit. If the timeout circuit is configured to operate in a test mode, such as may be indicated by the state the inject error signal described above or a configuration register, decision block 404 directs the process to block 406 and the timeout circuit generates a ready signal to the master circuit, does not transmit the valid signal to the salve circuit, and continues processing at block 408. Otherwise, if the state of the inject error signal indicates that the timeout circuit is not to operate in a test mode, the timeout circuit bypasses generating of the ready signal, transmits the valid signal to the slave circuit, and proceeds to block 408.

At block 408, the timeout circuit receives the transaction from the master circuit, and at block 410 the timeout circuit stores information that describes the transaction in the top-most register of the register stack. The transaction information may include a transaction identifier, a transaction length, and a timeout value as described above. A timed-out value and an empty value may also be stored to indicate the status of the transaction and status of the register. Though the generating of the ready signal at block 406 and the storing of the transaction data at block 410 are shown as sequential operations, it will be recognized that the operations may be performed in parallel. As described above, the timeout circuit may maintain two register stacks, a first register stack for read transactions and a second register stack for write transactions. The timeout circuit stores data descriptive of read transactions in the first register stack and stores data descriptive of write transactions in the second register stack.

At block 412, the timeout circuit determines whether or not any transactions have timed-out based on the current time, the timeout values of the transactions, and the numbers of expected responses remaining for the transactions based on the length values. For each timed-out transaction, the timeout circuit stores a timeout flag in the corresponding register of the register stack. As indicated above, for example, a logic 1 value stored in the timed-out portion of the register may serve as a timeout flag to indicate that the transaction has timed-out.

A response to a transaction is received by the timeout circuit from the slave circuit at block 414, and the timeout circuit updates the register stack accordingly. As described above, the timeout circuit determines the oldest transaction in the register stack that matches the transaction ID in the response and updates the length field of the matching register to indicate a response has been received for the transaction. If the length value is equal to 1 when the matching response is received, the response is the last of the number of expected responses, and the contents of the register above may be copied to the empty register at block 418.

At block 420, the timeout circuit checks the timed-out value in the bottom-most register in the register stack. If the timed-out value indicates that the transaction has timed-out, at block 422, the timeout circuit generates and transmits the expected number of responses as indicated by the length value in the bottom-most register. The timeout circuit may also generate an error or interrupt signal to the master circuit and generate an additional error interrupt to indicate the timeout scenario to a processor. The process continues at block 424, by processing further input transactions from the master circuit and responses from the slave circuit.

Figure 5:
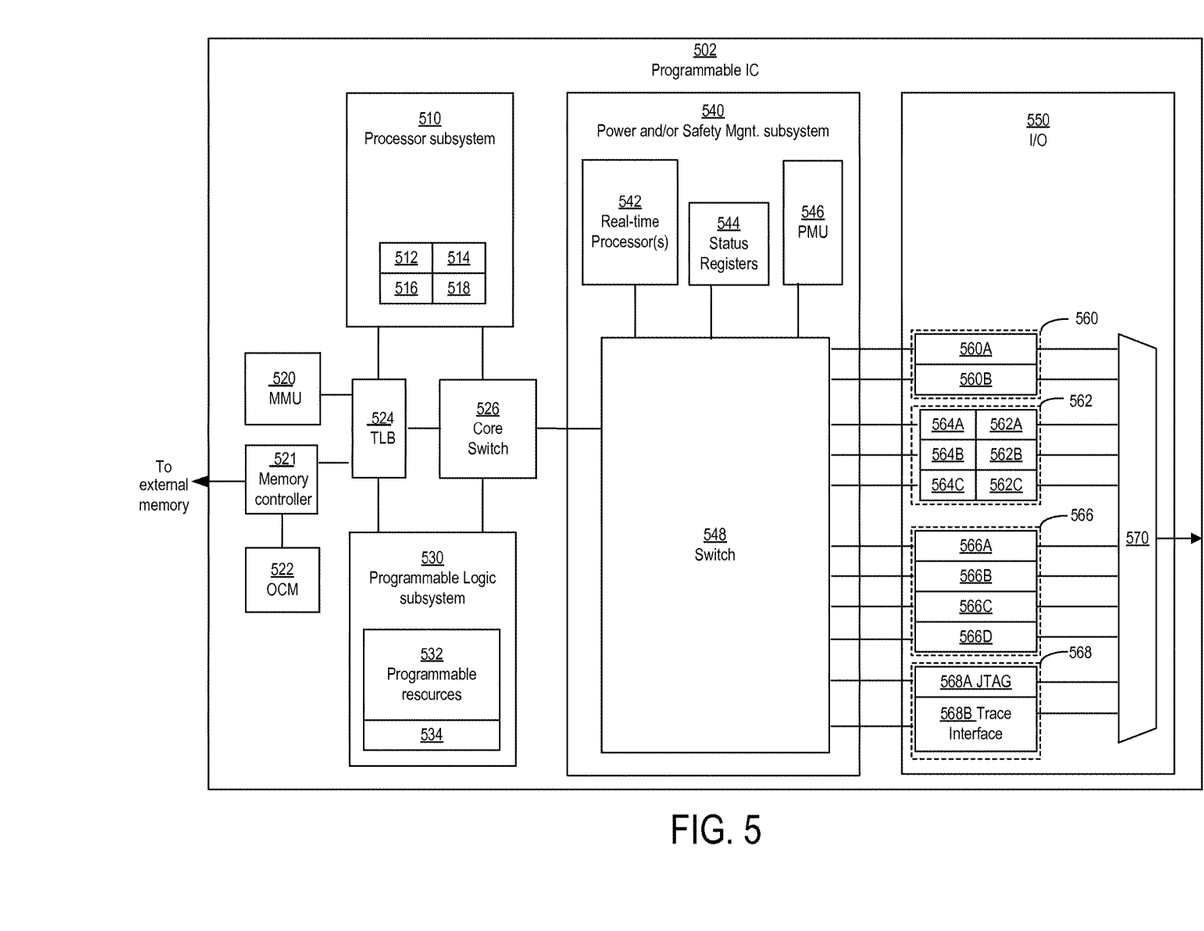
FIG. 5 shows a programmable IC in which one or more timeout circuits may be disposed between master circuits and slave circuits.

FIG. 5 shows a programmable IC 502 in which one or more timeout circuits may be disposed between master circuits and slave circuits. The programmable IC may also be referred to as a System On Chip (SOC), which includes a processor subsystem 510 and a programmable logic subsystem 530. The processor subsystem 510 may be programmed to implement a software portion of the user design, via execution of a user program. The program may be specified as part of a configuration data stream or may be retrieved from an on-chip or off-chip data storage device. The processor subsystem 510 may include various circuits 512, 514, 516, and 518 for executing one or more software programs. The circuits 512, 514, 516, and 518 may include, for example, one or more processor cores, floating point units (FPUs), an interrupt processing unit, on chip-memory, memory caches, and/or cache coherent interconnect.

One or more timeout circuits (not shown) may be connected between master circuits of the programmable IC 502 and slave circuits of the programmable IC. For example, master circuits may include the processor subsystem 510, real-time processors 542, and circuits implemented in the programmable resources 532 of the programmable logic subsystem 530. The slave circuits may include the on-chip memory 522, external memory, and circuits implemented in the programmable resources 532, for example.

The programmable logic subsystem 530 of the programmable IC 502 may be programmed to implement a hardware portion of a user design. For instance, the programmable logic subsystem may include a number of programmable resources 532, which may be programmed to implement a set of circuits specified in a configuration data stream. The programmable resources 532 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 532 may be programmed by loading a configuration data stream into the configuration memory cells, which define how the programmable interconnect circuits and programmable logic circuits are configured. The collective states of the individual memory cells then determine the function of the programmable resources 532. The configuration data can be read from memory (e.g., from an external PROM) or written into the programmable IC 502 by an external device. In some implementations, configuration data may be loaded into configuration memory cells by a configuration controller 534 included in the programmable logic subsystem 530. In some other implementations, the configuration data may be loaded into the configuration memory cells by a start-up process executed by the processor subsystem 510.

The programmable IC 502 may include various circuits to interconnect the processor subsystem 510 with circuitry implemented within the programmable logic subsystem 530. In this example, the programmable IC 502 includes a core switch 526 that can route data signals between various data ports of the processor subsystem 510 and the programmable logic subsystem 530. The core switch 526 may also route data signals between either of the programmable logic or processing subsystems 510 and 530 and various other circuits of the programmable IC, such as an internal data bus. Alternatively or additionally, the processor subsystem 510 may include an interface to directly connect with the programmable logic subsystem—bypassing the core switch 526. Such an interface may be implemented, for example, using the AMBA AXI Protocol Specification (AXI) as published by ARM.

In some implementations, the processor subsystem 510 and the programmable logic subsystem 530 may also read or write to memory locations of an on-chip memory 522 or off-chip memory (not shown) via memory controller 521. The memory controller 521 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 521 is able to communicate is provided for purposes of illustration only and is not intended as a limitation or to be exhaustive. As shown in FIG. 5, the programmable IC 502 may include a memory management unit 520 and translation look-aside buffer 524 to translate virtual memory addresses used by the subsystems 510 and 530 to physical memory addresses used by the memory controller 521 to access specific memory locations.

The programmable IC may include an input/output (I/O) subsystem 550 for communication of data with external circuits. The I/O subsystem 550 may include various types of I/O devices or interfaces including for example, flash memory type I/O devices, higher performance I/O devices, lower performance interfaces, debugging I/O devices, and/or RAM I/O devices.

The I/O subsystem 550 may include one or more flash memory interfaces 560 illustrated as 560A and 560B. For example, one or more of flash memory interfaces 560 can be implemented as a Quad-Serial Peripheral Interface (QSPI) configured for 4-bit communication. One or more of flash memory interfaces 560 can be implemented as a parallel 8-bit NOR/SRAM type of interface. One or more of flash memory interfaces 560 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 550 can include one or more interfaces 562 providing a higher level of performance than flash memory interfaces 560. Each of interfaces 562A-562C can be coupled to a DMA controller 564A-564C respectively. For example, one or more of interfaces 562 can be implemented as a Universal Serial Bus (USB) type of interface. One or more of interfaces 562 can be implemented as a gigabit Ethernet type of interface. One or more of interfaces 562 can be implemented as a Secure Digital (SD) type of interface.

The I/O subsystem 550 may also include one or more interfaces 566 such as interfaces 566A-566D that provide a lower level of performance than interfaces 562. For example, one or more of interfaces 566 can be implemented as a General Purpose I/O (GPIO) type of interface. One or more of interfaces 566 can be implemented as a Universal Asynchronous Receiver/Transmitter (UART) type of interface. One or more of interfaces 566 can be implemented in the form of a Serial Peripheral Interface (SPI) bus type of interface. One or more of interfaces 566 can be implemented in the form of a Controller-Area-Network (CAN) type of interface and/or an $I^2C$ type of interface. One or more of interfaces 566 also can be implemented in the form of a timer type of interface.

The I/O subsystem 550 can include one or more debug interfaces 568 such as processor JTAG (PJTAG) interface 568A and a trace interface 568B. PJTAG interface 568A can provide an external debug interface for the programmable IC 502. Trace interface 568B can provide a port to receive debug, e.g., trace, information from the processor subsystem 510 or the programmable logic subsystem 530.

As shown, each of interfaces 560, 562, 566, and 568 can be coupled to a multiplexer 570. Multiplexer 570 provides a plurality of outputs that can be directly routed or coupled to external pins of the programmable IC 502, e.g., balls of the package within which the programmable IC 502 is disposed. For example, I/O pins of programmable IC 502 can be shared among interfaces 560, 562, 566, and 568. A user can configure multiplexer 570, via a configuration data stream to select which of interfaces 560-568 are to be used and, therefore, coupled to I/O pins of programmable IC 502 via multiplexer 570. The I/O subsystem 550, may also include a fabric multiplexer I/O (FMIO) interface (not shown) to connect interfaces 562-568 to programmable logic circuits of the programmable logic subsystem. Additionally or alternatively, the programmable logic subsystem 530 can be configured to implement one or more I/O circuits within programmable logic. In some implementations, the programmable IC 502 may also include a subsystem 540 having various circuits for power and/or safety management. For example, the subsystem 540 may include a power management unit 546 configured to monitor and maintain one or more voltage domains used to power the various subsystems of the programmable IC 502. In some implementations, the power management unit 546 may disable power of individual subsystems, when idle, to reduce power consumption, without disabling power to subsystems in use.

The subsystem 540 may also include safety circuits to monitor the status of the subsystems to ensure correct operation. For instance, the subsystem 540 may include one or more real-time processors 542 configured to monitor the status of the various subsystems (e.g., as indicated in status registers 544). The real-time processors 542 may be configured to perform a number of tasks in response to detecting errors. For example, for some errors, the real-time processors 542 may generate an alert in response to detecting an error. As another example, the real-time processors 542 may reset a subsystem to attempt to restore the subsystem to correct operation. The subsystem 540 includes a switch network 548 that may be used to interconnect various subsystems. For example, the switch network 548 may be configured to connect the various subsystems 510, 530, and 540 to various interfaces of the I/O subsystem 550. In some applications, the switch network 548 may also be used to isolate the real-time processors 542 from the subsystems that are to be monitored. Such isolation may be required by certain application standards (e.g., IEC-61508 SIL3 or ISO-26262 standards) to ensure that the real-time processors 542 are not affected by errors that occur in other subsystems.

Though aspects and features may in some cases be described in individual figures, it will be appreciated that features from one figure can be combined with features of another figure even though the combination is not explicitly shown or explicitly described as a combination.

The systems and methods are thought to be applicable to a variety of systems for detecting timed-out transactions. Other aspects and features will be apparent to those skilled in the art from consideration of the specification. The systems and methods may be implemented as an application specific integrated circuit (ASIC) or as a circuit in programmable logic. It is intended that the specification and drawings be considered as examples only, with a true scope of the invention being indicated by the following claims.

What is claimed is:

1. A circuit arrangement, comprising:
a master circuit configured and arranged to generate write transactions and read transactions;
a slave circuit configured and arranged to generate responses to the write transactions and the read transactions from the master circuit;
a first circuit coupled between the master circuit and the slave circuit, the first circuit configured and arranged to:
determine for each write transaction from the master circuit whether the slave circuit generates an expected number of responses to the write transaction within a timeout period,
generate and transmit the expected number of responses via a write response channel to the master circuit for each write transaction for which the slave circuit does not generate the expected number of responses within the timeout period;
determine for each read transaction from the master circuit whether the slave circuit generates an expected number of responses to the read transaction within a timeout period; and
generate and transmit the expected number of responses via a read response channel to the master circuit for each read transaction for which the slave circuit does not generate the expected number of responses within the timeout period.

2. The circuit arrangement of claim 1 wherein the first circuit includes:
a first register stack of registers, and each register in the first register stack stores data describing the write transactions; and
a second register stack of registers, and each register in the second register stack stores data describing the read transactions.

3. The circuit arrangement of claim 2, wherein:
each register in the first register stack includes storage for a transaction identifier, transaction length, a timeout value, a timeout flag, and an empty flag;
each register in the second register stack includes storage for a transaction identifier, transaction length, a timeout value, a timeout flag, and an empty flag; and
the first circuit further includes:
a first sub-circuit coupled to the first register stack and configured and arranged to move the data describing the read transactions through the first register stack; and
a second sub-circuit coupled to the first register stack and configured and arranged to:
store a value indicative of an empty register in the storage for the empty flag of a register in the first register stack in response to a matching transaction, and
store a value indicative of a timed-out transaction in the storage for the timeout flag of a register in the first register stack in response to detecting a timed-out transaction from the timeout value;
a third sub-circuit coupled to the second register stack and configured and arranged to move the data describing the write transactions through the second register stack; and
a fourth sub-circuit coupled to the second register stack and configured and arranged to:

store a value indicative of an empty register in the storage for the empty flag of a register in the second register stack in response to a matching transaction, and store a value indicative of a timed-out transaction in the storage for the timeout flag of a register in the second register stack in response to detecting a timed-out transaction from the timeout value.

4. The circuit arrangement of claim 3, wherein:

the first sub-circuit is further configured and arranged to copy contents from a first register above a second register in the first register stack to the second register in response to the empty flag in the second register indicating the second register is empty, or the empty flag in a third register below the second register in the first register stack indicating the third register is empty; and the third sub-circuit is further configured and arranged to copy contents from a fourth register above a fifth register in the second register stack to the fifth register in response to the empty flag in the fifth register indicating the fifth register is empty, or the empty flag in a sixth register below the fifth register in the second register stack indicating the sixth register is empty.

5. The circuit arrangement of claim 2, wherein:

each register in the first register stack includes storage for a transaction identifier, transaction length, a timeout value, a timeout flag, and an empty flag;

each register in the second register stack includes storage for a transaction identifier, transaction length, a timeout value, a timeout flag, and an empty flag;

the first circuit includes a first sub-circuit configured and arranged to generate the error signal in response to a bottom-most register in the first register stack having a value of the timeout flag indicative of a timed-out transaction; and the first circuit includes a second sub-circuit configured and arranged to generate the error signal in response to a bottom-most register in the second register stack having a value of the timeout flag indicative of a timed-out transaction.

6. The circuit arrangement of claim 2, wherein:

the master circuit is further configured and arranged to generate a valid signal concurrent with generating each read transaction and each write transaction; and the first circuit is responsive to an inject-error signal that enables or disables a test mode, and the first circuit is further configured and arranged to:

generate a ready signal to the master circuit in response to receipt of the valid signal and a first value of the inject-error signal, and bypass generation of the ready signal to the master circuit in response to receipt of the valid signal and a second value of the inject-error signal.

7. A method of detecting timed-out transactions between a master circuit and a slave circuit, comprising:

receiving write transactions and read transactions from the master circuit in a first circuit coupled between the master circuit and the slave circuit, the transactions addressed to the slave circuit;

determining by the first circuit for each write transaction from the master circuit whether the slave circuit generates an expected number of responses to the write transaction within a timeout period;

generating by the first circuit and transmitting the expected number of responses via a write response channel to the master circuit for each write transaction for which the slave circuit does not generate the expected number of responses within the timeout period;

determining by the first circuit for each read transaction from the master circuit whether the slave circuit generates an expected number of responses to the read transaction within a timeout period; and generating by the first circuit and transmitting the expected number of responses via a read response channel to the master circuit for each the read transaction for which the slave circuit does not generate the expected number of responses within the timeout period.

8. The method of claim 7, further comprising:

storing data descriptive of read transactions of the transactions received from the master circuit in a first register stack of registers of the first circuit; and storing data descriptive of write transactions of the transactions received from the master circuit in a second register stack of registers of the first circuit.

9. The method of claim 8, wherein:

the storing data descriptive of read transactions includes:

storing for each read transaction a transaction identifier, transaction length, a timeout value, a timeout flag, and an empty flag in a register in the first register stack;

storing an empty flag indicative of an empty register in a register in the first register stack and shifting data from one register in the first register stack to the register in the first register stack having the empty flag indicative of the empty register, in response to a completed transaction; and storing a timeout flag indicative of a timed-out transaction in a register in the first register stack in response to detecting a timed-out transaction from the timeout value; and the storing data descriptive of write transactions includes:

storing for each read transaction a transaction identifier, transaction length, a timeout value, a timeout flag, and an empty flag in a register in the second register stack;

storing an empty flag indicative of an empty register in a register in the second register stack and shifting data from one register in the second register stack to the register in the second register stack having the empty flag indicative of the empty register, in response to a completed transaction; and storing a timeout flag indicative of a timed-out transaction in a register in the second register stack in response to detecting a timed-out transaction from the timeout value.

10. The method of claim 9, further comprising:

generating a first error signal in response to a bottom-most register in the first register stack having the timeout flag indicative of a timed-out transaction; and generating a second error signal in response to a bottom-most register in the second register stack having the timeout flag indicative of a timed-out transaction.

11. The method of claim 8, further comprising:

generating by the master circuit a valid signal concurrent with generating each read transaction and each write transaction;

generating by the first circuit a ready signal in response to receipt of the valid signal and a first value of an inject-error signal; and bypassing the generating of the ready signal by the first circuit in response to receipt of the valid signal and a second value of the inject-error signal.

* * * * *